United States Patent
Lin et al.

(10) Patent No.: US 10,969,887 B2
(45) Date of Patent: Apr. 6, 2021

(54) TOUCH DISPLAY DEVICE

(71) Applicant: Au Optronics Corporation, Hsinchu (TW)

(72) Inventors: Tai-Hsuan Lin, Hsinchu (TW); Yu-Feng Chien, New Taipei (TW)

(73) Assignee: Au Optronics Corporation, Hsinchu (TW)

( * ) Notice: Subject to any disclaimer, the term of this patent is extended or adjusted under 35 U.S.C. 154(b) by 27 days.

(21) Appl. No.: 16/262,931

(22) Filed: Jan. 31, 2019

(65) Prior Publication Data
US 2019/0286267 A1 Sep. 19, 2019

(30) Foreign Application Priority Data
Mar. 13, 2018 (TW) .................................. 107108511

(51) Int. Cl.
*G06F 3/041* (2006.01)
*G02F 1/1333* (2006.01)
(Continued)

(52) U.S. Cl.
CPC .......... *G06F 3/0412* (2013.01); *G02F 1/1368* (2013.01); *G02F 1/13338* (2013.01); *G02F 1/134309* (2013.01); *G02F 1/136209* (2013.01); *G02F 1/136286* (2013.01); *G06F 3/044* (2013.01); *G02F 1/136222* (2021.01); *G02F 2201/121* (2013.01); *G02F 2201/123* (2013.01);
(Continued)

(58) Field of Classification Search
CPC .......... G02F 1/13338; G02F 1/134309; G02F 1/136209; G02F 1/136286; G02F 1/1368; G06F 3/0412; G06F 3/044
See application file for complete search history.

(56) References Cited

U.S. PATENT DOCUMENTS

| 2009/0174649 A1* | 7/2009 | Kim ...................... G09G 3/3688 |
| | | 345/104 |
| 2010/0149116 A1* | 6/2010 | Yang ....................... G06F 3/044 |
| | | 345/173 |
| 2014/0009442 A1* | 1/2014 | Kim ........................ G06F 3/044 |
| | | 345/174 |

FOREIGN PATENT DOCUMENTS

| CN | 104978069 | 10/2015 |
| TW | I613581 | 2/2018 |

* cited by examiner

*Primary Examiner* — Alexander Eisen
*Assistant Examiner* — Corey A Almeida
(74) *Attorney, Agent, or Firm* — JCIPRNET

(57) ABSTRACT

A touch display device including scan lines, data lines, metal common lines, pixel sets, a common electrode layer, light-shielding patterns and touch electrode patterns is provided. Each metal common line is located between two adjacent scan lines. Each pixel set is located between two adjacent metal common lines. The common electrode layer includes common electrode portions disposed corresponding to the metal common lines. A vertical projection of each metal common line is completely located within a vertical projection of the corresponding common electrode portion. The light-shielding patterns are disposed corresponding to the metal common lines, and a vertical projection of each metal common line and the scan lines adjacent thereto is completely located within a vertical projection of the corresponding light-shielding pattern. The touch electrode patterns are disposed corresponding to the metal common lines, and a vertical projection of each touch electrode pattern is completely located within a vertical projection of the corresponding common electrode portion.

17 Claims, 5 Drawing Sheets

(51) Int. Cl.
*G02F 1/1343* (2006.01)
*G02F 1/1362* (2006.01)
*G02F 1/1368* (2006.01)
*G06F 3/044* (2006.01)

(52) U.S. Cl.
CPC .............. *G06F 2203/04107* (2013.01); *G06F 2203/04112* (2013.01)

TOUCH DISPLAY DEVICE

CROSS-REFERENCE TO RELATED APPLICATION

This application claims the priority benefit of Taiwan application serial no. 107108511, filed on Mar. 13, 2018. The entirety of the above-mentioned patent application is hereby incorporated by reference herein and made a part of this specification.

BACKGROUND OF THE INVENTION

Field of the Invention

The invention relates to a display device, and particularly relates to a touch display device.

Description of Related Art

In the modern information society, the dependence of people on electronic products is increasing day by day. In order to achieve more convenient, more light-weight and more user friendly, many information products have been changed from a traditional input device, such as a keyboard or a mouse to using a touch panel as the input devices, wherein a touch display panel with touch and display functions has become one of the most popular products nowadays. The current touch panel can be broadly divided into a capacitance type, a resistance type and a photosensitive type touch panel, wherein the capacitance type touch panel is the mainstream product. Since most of the current touch panels have the problem that the touch sensitivity is limited, how to improve the touch sensitivity is actually an urgent problem to overcome for the touch panel.

SUMMARY OF THE INVENTION

The invention provides a touch display device, which has good touch area and is able to prevent a touch signal from being disturbed by a display signal, thereby having improved touch sensitivity.

The invention provides a touch display device including a pixel array substrate, an opposite substrate and a liquid crystal layer. The pixel array substrate includes a first substrate, a plurality of scan lines, a plurality of data lines, a plurality of first metal common lines, a plurality of pixel sets and a common electrode layer. The plurality of scan lines and the plurality of data lines are disposed on the first substrate, wherein the data lines are not disposed parallel to the scan lines. The plurality of first metal common lines are disposed on the first substrate, and each of the first metal common lines is disposed between two adjacent scan lines. The plurality of pixel sets are arranged in array on the first substrate. Each of the pixel sets is located between two adjacent first metal common lines, and each of the pixel sets is electrically connected to two of the scan lines and one of the data lines. The common electrode layer is disposed on the first substrate, wherein the pixel sets are structurally separated from the common electrode layer. The common electrode layer includes a plurality of first common electrode portions and a plurality of second common electrode portions. The first common electrode portions are disposed corresponding to the first metal common lines, and a vertical projection of each of the first metal common lines on the first substrate is completely located within a vertical projection of the corresponding first common electrode portion on the first substrate. The opposite substrate is disposed opposite to the pixel array substrate, and includes a second substrate, a plurality of first light-shielding patterns and a plurality of first touch electrode patterns. The plurality of first light-shielding patterns are disposed on the second substrate, wherein the first light-shielding patterns are disposed corresponding to the first metal common lines. A vertical projection of each of the first metal common lines and the two scan lines adjacent to each of the first metal common lines on the first substrate is completely located within a vertical projection of the corresponding first light-shielding pattern on the first substrate. The plurality of first touch electrode patterns are disposed on the first light-shielding patterns, wherein the first touch electrode patterns are disposed corresponding to the first metal common lines. A vertical projection of each of the first touch electrode patterns on the first substrate is completely located within a vertical projection of the corresponding first common electrode portion on the first substrate. The liquid crystal layer is disposed between the pixel array substrate and the opposite substrate.

Based on the above, in the touch display device of the invention, the pixel array substrate includes the plurality of scan lines, the plurality of data lines, the plurality of first metal common lines, the plurality of pixel sets and the common electrode layer disposed on the first substrate, wherein each of the first metal common lines is disposed between the two adjacent scan lines, each of the pixel sets is located between the two adjacent first metal common lines, each of the pixel sets is electrically connected to two scan lines and one data line, the vertical projection of each of the first metal common lines on the first substrate is completely located within the vertical projection of the corresponding first common electrode portion included in the common electrode layer on the first substrate, and the opposite substrate includes the plurality of first light-shielding patterns and the plurality of first touch electrode patterns disposed on the second substrate, wherein the vertical projection of each of the first metal common lines and the two scan lines adjacent to each of the first metal common lines on the first substrate is completely located within the vertical projection of the corresponding first light-shielding pattern on the first substrate, the vertical projection of each of the first touch electrode patterns on the first substrate is completely located within the vertical projection of the corresponding first common electrode portion on the first substrate. Thereby, the touch display device of the invention has good touch area and is able to prevent the touch signal from being disturbed by the display signal, thereby having the improved touch sensitivity.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
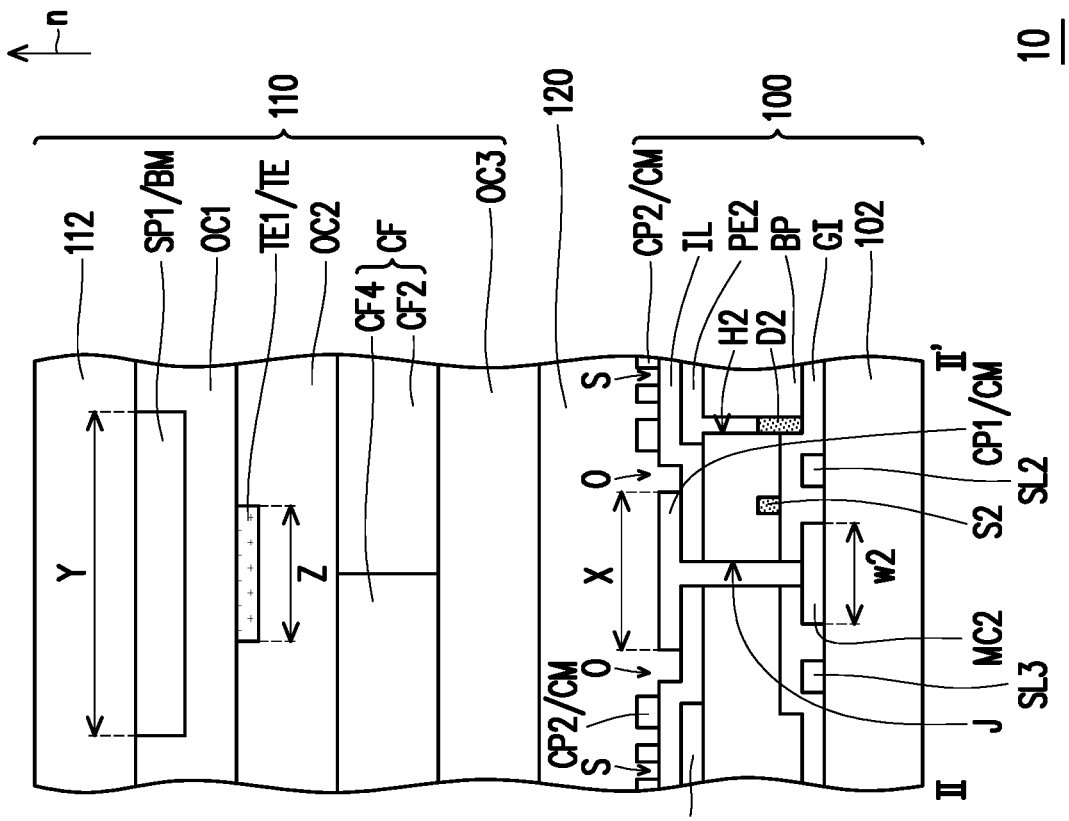
FIG. 1 is a schematic partial cross-sectional view of a touch display device according to an embodiment of the invention.
Figure 1:
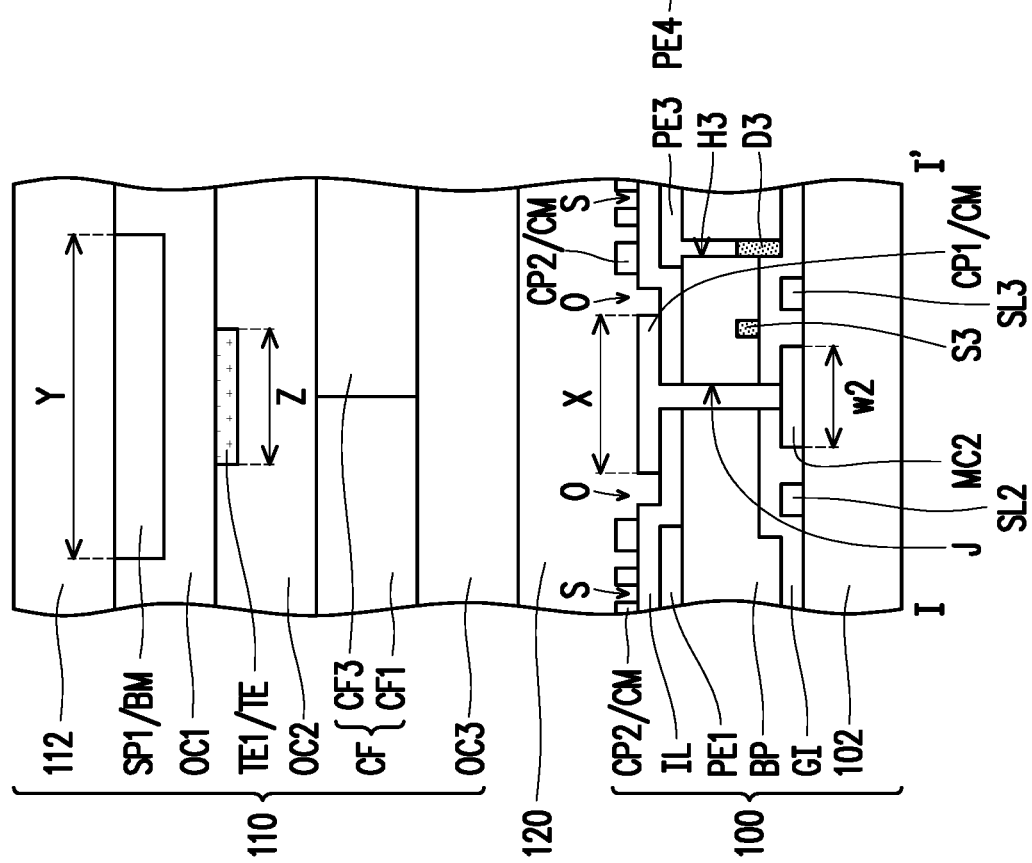

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
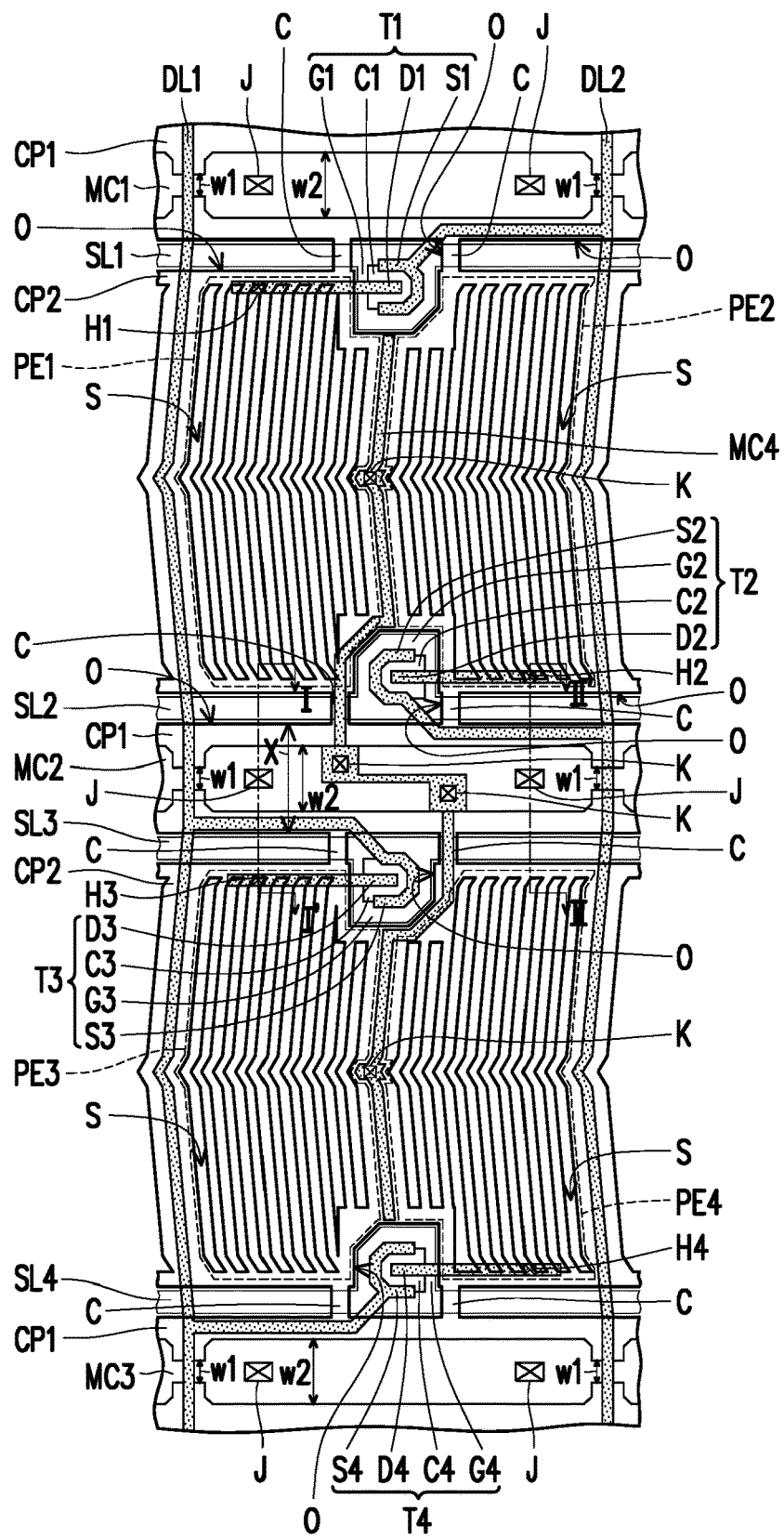
FIG. 2 is a schematic top view of a pixel array substrate in the touch display device of FIG. 1.
Figure 3:
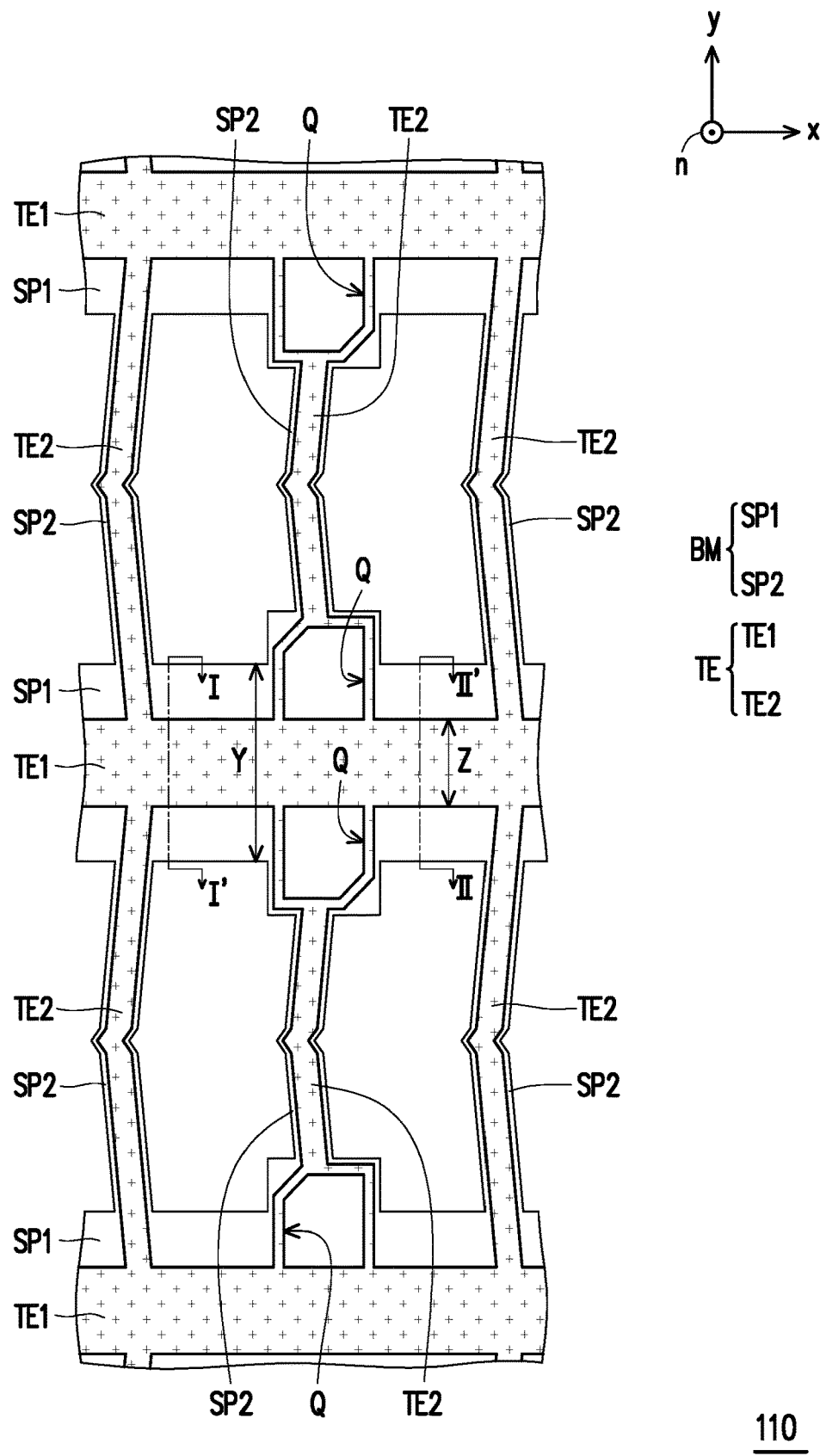
FIG. 3 is a schematic top view of an opposite substrate in the touch display device of FIG. 1.

FIG. 1 is a schematic partial cross-sectional view of a touch display device according to an embodiment of the invention. FIG. 2 is a schematic top view of a pixel array substrate in the touch display device of FIG. 1. FIG. 3 is a schematic top view of an opposite substrate in the touch display device of FIG. 1. It should be noted that, the cross-sectional positions of FIG. 1 respectively correspond to the positions of a section line I-I' and a section line II-II' in FIG. 2 and FIG. 3.

Referring to FIG. 1 to FIG. 3, in this embodiment, a touch display device 10 includes a pixel array substrate 100, an opposite substrate 110 and a liquid crystal layer 120. Specifically, in this embodiment, the pixel array substrate 100 may include a first substrate 102, a plurality of scan lines SL1~SL4, a plurality of data lines DL1~DL2, a plurality of first metal common lines MC1~MC3, a plurality of pixel sets U1~U2 and a common electrode layer CM. In this embodiment, the pixel array substrate 100 may optionally further include a second metal common line MC4. On the other hand, in this embodiment, the opposite substrate 110 disposed opposite to the pixel array substrate 100 may include a second substrate 112, a plurality of first light-shielding patterns SP1 and a plurality of first touch electrode patterns TE1. In this embodiment, the opposite substrate 110 may optionally further include a plurality of second light-shielding patterns SP2, a plurality of second touch electrode patterns TE2, an insulation layer OC1, an insulation layer OC2, a color filter layer CF and an insulation layer OC3.

It should be mentioned that, for clarity, only two pixel sets U1~U2 are shown in FIG. 1 to FIG. 3, but persons of ordinary skill in the art should be able to understand that the touch display device 10 may actually include a plurality of pixel sets arranged in array. Additionally, for clearer descriptions, the first substrate 102 is not shown in FIG. 2, and the second substrate 112, the insulation layer OC1, the insulation layer OC2, the color filter layer CF and the insulation layer OC3 are not shown in FIG. 3.

In this embodiment, the liquid crystal layer 120 is disposed between the pixel array substrate 100 and the opposite substrate 110. In other words, the touch display device 10 includes a liquid crystal display panel.

In this embodiment, materials of the first substrate 102 and the second substrate 112 may be glass, quartz, or organic polymer.

In this embodiment, the scan lines SL1~SL4 and the data lines DL1~DL2 are disposed on the first substrate 102. In this embodiment, the scan lines SL1~SL4 are not disposed parallel to the data lines DL1~DL2. In this embodiment, the extending direction of the scan lines SL1~SL4 is different from the extending direction of the data lines DL1~DL2. That is, the extending direction of the scan lines SL1~SL4 intersects the extending direction of the data lines DL1~DL2. Additionally, in this embodiment, the scan lines SL1~SL4 are sequentially arranged along a second direction y, and the data lines DL1~DL2 are sequentially arranged along a first direction x. Additionally, the scan lines SL1~SL4 and the data lines DL1~DL2 may be located at different layers, and a gate insulation layer GI (described in detail later) may be sandwiched between the scan lines SL1~SL4 and the data lines DL1~DL2. In consideration of conductivity, the scan lines SL1~SL4 and the data lines DL1~DL2 are generally made of a metal material. However, the invention is not limited thereto. According to other embodiments, the scan lines SL1~SL4 and the data lines DL1~DL2 may also be made of other conductive materials such as an alloy, a nitride of said metal material, an oxide of said metal material, an oxynitride of said metal material, or a stacked layer of said metal material and said other conductive materials.

In this embodiment, the first metal common lines MC1~MC3 are disposed on the first substrate 102. In this embodiment, each of the first metal common lines MC1~MC3 is respectively disposed between two adjacent scan lines. Specifically, as shown in FIG. 2, the first metal common line MC2 is disposed between the scan line SL2 and the scan line SL3. Although not shown in FIG. 2, persons of ordinary skill in the art should be able to understand that, the first metal common line MC1 is disposed between the scan line SL1 and a previous scan line (not shown) disposed along the second direction y, and the first metal common line MC3 is disposed between the scan line SL4 and a next scan line (not shown) disposed along the second direction y. In other words, in this embodiment, the first metal common lines MC1~MC3 are sequentially arranged along the second direction y. From another point of view, in this embodiment, the first metal common lines MC1~MC3 may be disposed parallel to the scan lines SL1~SL4.

In this embodiment, the material of the first metal common lines MC1~MC3 may be the same as the material of the scan lines SL1~SL4. In other words, in this embodiment, the first metal common lines MC1~MC3 may belong to the same layer or be made by the same layer as the scan lines SL1~SL4. However, the invention is not limited thereto. In other embodiments, the first metal common lines MC1~MC3 may also belong to the same layer as the data lines DL1~DL2. In other embodiments, the first metal common lines MC1~MC3 may not belong to the same layer as the scan lines SL1~SL4 and the data lines DL1~DL2. Additionally, in this embodiment, the first metal common lines MC1~MC3 are electrically connected to a common voltage, such as about 0 V.

In this embodiment, the main width w2 of the first metal common lines MC1~MC3 is between about 3 μm and about 300 μm, preferably between about 10 μm and about 100 μm. Specifically, the main width w2 of the first metal common lines MC1~MC3 is within the aforementioned range, so that the stability of the common voltage in the touch display device 10 is improved. Thereby, the flickering or blur phenomenon occurred on the display screen is avoided, and the touch electrode area of the touch display device 10 is improved, such that the touch display device 10 has improved touch sensitivity.

In this embodiment, as shown in FIG. 2, an intersection portion of the first metal common lines MC1~MC3 with the data lines DL1~DL2 has a width w1, wherein the width w1 is less than the main width w2. With the design, a capacitance load between the first metal common lines MC1~MC3 and the data lines DL1~DL2 in the touch display device 10 may be reduced, thereby improving the display quality.

In this embodiment, the second metal common line MC4 is disposed on the first substrate 102. In this embodiment, the second metal common line MC4 is located between the data line DL1 and the data line DL2, and the second metal common line MC4 has the same extending direction as the data line DL1 and the data line DL2. In other words, the second metal common line MC4 is located between two adjacent data lines. It should be mentioned that, although only one second metal common line MC4 is shown in FIG. 2, persons of ordinary skill in the art should be able to understand that the touch display device 10 may actually include a plurality of second metal common lines MC4 respectively disposed between any two adjacent data lines.

In this embodiment, the material of the second metal common line MC4 may be the same as the material of the data lines DL1~DL2. In other words, in this embodiment, the second metal common line MC4 may belong to the same layer as the data lines DL1~DL2. However, the invention is not limited thereto. In other embodiments, the second metal common line MC4 may also belong to the same layer as the scan lines SL1~SL4. In other alternative embodiments, the second metal common line MC4 may not belong to the same layer as the scan lines SL1~SL4 and the data lines DL1~DL2. Additionally, in this embodiment, the second metal common line MC4 is electrically connected to a common voltage, such as about 0 V.

In this embodiment, the pixel sets U1~U2 are disposed on the first substrate 102. In this embodiment, the pixel set U1 includes a first pixel unit U1a and a second pixel unit U1b arranged along the first direction x, and the pixel set U1 is disposed between the scan lines SL1-SL2 and the data lines DL1~DL2. The pixel set U2 includes a first pixel unit U2a and a second pixel unit U2b arranged along the first direction x, and the pixel set U2 is disposed between the scan lines SL3-SL4 and the data lines DL1~DL2. Specifically, in this embodiment, the first pixel unit U1a includes an active element T1 and a pixel electrode PE1; the second pixel unit U1b includes an active element T2 and a pixel electrode PE2; the first pixel unit U2a includes an active element T3 and a pixel electrode PE3; the second pixel unit U2b includes an active element T4 and a pixel electrode PE4.

In this embodiment, the active element T1 is a bottom-gate thin film transistor, which includes a gate G1, a channel layer C1 disposed corresponding to the gate G1, and a drain D1 and a source S1 located on the channel layer C1; the active element T2 is a bottom-gate thin film transistor, which includes a gate G2, a channel layer C2 disposed corresponding to the gate G2, and a drain D2 and a source S2 located on the channel layer C2; the active element T3 is a bottom-gate thin film transistor, which includes a gate G3, a channel layer C3 disposed corresponding to the gate G3, and a drain D3 and a source S3 located on the channel layer C3; the active element T4 is a bottom-gate thin film transistor, which includes a gate G4, a channel layer C4 disposed corresponding to the gate G4, and a drain D4 and a source S4 located on the channel layer C4. However, the invention is not limited thereto. In other embodiments, the active element T1, the active element T2, the active element T3 and the active element T4 may also be top gate thin film transistors or dual gate thin film transistors, for example.

In this embodiment, the gate G1 and the scan line SL1 are a continuous conductive pattern, which indicates that the gate G1 and the scan line SL1 are electrically connected to each other; the gate G2 and the scan line SL2 are a continuous conductive pattern, which indicates that the gate G2 and the scan line SL2 are electrically connected to each other; the gate G3 and the scan line SL3 are a continuous conductive pattern, which indicates that the gate G3 and the scan line SL3 are electrically connected to each other; the gate G4 and the scan line SL4 are a continuous conductive pattern, which indicates that the gate G4 and the scan line SL4 are electrically connected to each other. In other words, in the pixel set U1, the active element T1 of the first pixel unit U1a and the active element T2 of the second pixel unit U1b are electrically connected to different scan lines (i.e., the scan line SL1 and the scan line SL2), and in the pixel set U2, the active element T3 of the first pixel unit U2a and the active element T4 of the second pixel unit U2b are electrically connected to different scan lines (i.e., the scan line SL3 and the scan line SL4).

In this embodiment, the source S1 and the data line DL2 are a continuous conductive pattern, which indicates that the source S1 and the data line DL2 are electrically connected to each other; the source S2 and the data line DL2 are a continuous conductive pattern, which indicates that the source S2 and the data line DL2 are electrically connected to each other; the source S3 and the data line DL1 are a continuous conductive pattern, which indicates that the source S3 and the data line DL1 are electrically connected to each other; the source S4 and the data line DL1 are a continuous conductive pattern, which indicates that the source S4 and the data line DL1 are electrically connected to each other. In other words, in the pixel set U1, the active element T1 of the first pixel unit U1a and the active element T2 of the second pixel unit U1b are electrically connected to the same data line (i.e., the data line DL2), and in the pixel set U2, the active element T3 of the first pixel unit U2a and the active element T4 of the second pixel unit U2b are electrically connected to the same data line (i.e., the data line DL1). From another point of view, in this embodiment, the pixel set U1 is electrically connected to two scan lines SL1~SL2 and one data line DL2, and the pixel set U2 is electrically connected to two scan lines SL3~SL4 and one data line DL1.

Additionally, in this embodiment, the gate G1 of the active element T1, the gate G2 of the active element T2, the gate G3 of the active element T3 and the gate G4 of the active element T4 are further covered with the gate insulation layer GI above, and the active element T1, the active element T2, the active element T3 and the active element T4 are further covered with a protection layer BP above to protect the active element T1, the active element T2, the active element T3 and the active element T4. Materials of the gate insulation layer GI and the protection layer BP may be inorganic materials, organic materials or combinations thereof, wherein the inorganic material is, for example, silicon oxide, silicon nitride, silicon oxynitride or a stacked layer of at least two of the above materials; the organic material is, for example, a polymer material, such as a polyimide-based resin, an epoxy-based resin, or an acrylic-based resin. It should be noted that, for clearer descriptions, the gate insulation layer GI and the protection layer BP are not shown in FIG. 2.

In this embodiment, the pixel electrode PE1 is electrically connected to the drain D1 of the active element T1 via a contact window H1; the pixel electrode PE2 is electrically connected to the drain D2 of the active element T2 via a contact window H2; the pixel electrode PE3 is electrically connected to the drain D3 of the active element T3 via a contact window H3; the pixel electrode PE4 is electrically connected to the drain D4 of the active element T4 via a contact window H4. In other words, in this embodiment, the pixel electrode PE1, the pixel electrode PE2, the pixel electrode PE3 and the pixel electrode PE4 are electrically connected to the active element T1, the active element T2, the active element T3 and the active element T4, respectively. In this embodiment, materials of the pixel electrode PE1, the pixel electrode PE2, the pixel electrode PE3 and the pixel electrode PE4 may include a metal oxide conductive material, such as indium tin oxide, indium zinc oxide, aluminum tin oxide, aluminum zinc oxide, indium gallium zinc oxide, other suitable oxides, or a stacked layer of at least two of the above.

In this embodiment, the pixel set U1 is located between the first metal common line MC1 and the first metal common line MC2, and the pixel set U2 is located between the first metal common line MC2 and the first metal common line MC3. In other words, in this embodiment, each of the pixel sets U1~U2 is located between two adjacent first metal common lines.

In this embodiment, the common electrode layer CM is disposed on the first substrate 102. In this embodiment, the common electrode layer CM includes a plurality of first common electrode portions CP1 and a plurality of second common electrode portions CP2. In this embodiment, as shown in FIG. 2, the first common electrode portions CP1 and the second common electrode portions CP2 are alternately disposed with respect to each other, and the first common electrode portions CP1 and the second common electrode portions CP2 are connected to each other via connection portions C.

In this embodiment, the first common electrode portions CP1 are disposed corresponding to the first metal common lines MC1~MC3. In other words, in this embodiment, each of the first metal common lines MC1~MC3 is provided with the corresponding first common electrode portions CP1 above. Specifically, in this embodiment, the vertical projection of each of the first metal common lines MC1~MC3 on the first substrate 102 is completely located within the vertical projection of the corresponding first common electrode portion CP1 on the first substrate 102. In other words, in this embodiment, the main width w2 of the first metal common lines MC1~MC3 is less than or equal to the width X of the first common electrode portions CP1. In this embodiment, the width X of the first common electrode portions CP1 is between about 3 μm and about 300 μm, preferably between about 10 m and about 100 μm.

In this embodiment, the second common electrode portions CP2 have a plurality of slits S disposed corresponding to the pixel electrodes PE1~PE4. In other words, in this embodiment, the common electrode layer CM is a patterned electrode layer.

In this embodiment, the common electrode layer CM and the pixel electrodes PE1~PE4 are further provided with an intermediate insulation layer IL therebetween, so that the common electrode layer CM and the pixel sets U1~U2 are structurally separated from each other. That is, the common electrode layer CM is not electrically connected to the pixel electrodes PE1~PE4 and the active elements T1~T4 of the pixel sets U1~U2. As shown in FIG. 1, in this embodiment, the pixel electrodes PE1~PE4 are disposed below the intermediate insulation layer IL, and the common electrode layer CM is disposed above the intermediate insulation layer IL. The material of the intermediate insulation layer IL may be an inorganic material, an organic material or a combination thereof, wherein the inorganic material is, for example, silicon oxide, silicon nitride, silicon oxynitride or a stacked layer of at least two of the above materials; the organic material is, for example, a polymer material, such as a polyimide-based resin, an epoxy-based resin, or an acrylic-based resin.

It should be mentioned that, when the touch display device 10 is in a display mode, the pixel electrodes PE1~PE4 may generate a fringe electric field with the common electrode layer CM. In other words, in this embodiment, a portion of the common electrode layer CM corresponding to the pixel electrode PE1 is used as a common electrode of the first pixel unit U1a; a portion of the common electrode layer CM corresponding to the pixel electrode PE2 is used as a common electrode of the second pixel unit U1b; a portion of the common electrode layer CM corresponding to the pixel electrode PE3 is used as a common electrode of the first pixel unit U2a; a portion of the common electrode layer CM corresponding to the pixel electrode PE4 is used as a common electrode of the second pixel unit U2b. From another point of view, in this embodiment, the touch display device 10 may include a fringe field switching (FFS) display panel. Additionally, in this embodiment, the common electrode layer CM and the pixel electrodes PE1~PE4 are disposed on different planes, but the invention is not limited thereto. In other embodiments, the common electrode layer CM and the pixel electrodes PE1~PE4 may be substantially disposed on the same plane.

In this embodiment, the common electrode layer CM is electrically connected to a common voltage, such as about 0 V. Additionally, in this embodiment, the first metal common lines MC1~MC3 are electrically connected to the common electrode layer CM via contact windows J, and the second metal common line MC4 is electrically connected to the common electrode layer CM via contact windows K, but the invention is not limited thereto. In this embodiment, the first metal common lines MC1~MC3 are electrically connected to the common electrode layer CM via the contact windows J, and the second metal common line MC4 is electrically connected to the common electrode layer CM via the contact windows K, so that the stability of the common voltage of the touch display device 10 is improved. Thereby, the flickering or blur phenomenon occurred on the display screen is avoided.

In this embodiment, the common electrode layer CM may optionally further have a plurality of opening patterns O. Specifically, in this embodiment, in the vertical direction n of the first substrate 102, the opening patterns O overlap the active elements T1~T4 and the scan lines SL1~SL4. In this embodiment, with the opening patterns O of the common electrode layer CM overlapping the active elements T1~T4 and the scan lines SL1~SL4 in the vertical direction n, the increase of capacitance load can be avoided, thereby improving the display quality.

In this embodiment, the common electrode layer CM is, for example, a transparent conductive layer, and the material thereof includes a metal oxide conductive material, such as indium tin oxide, indium zinc oxide, aluminum tin oxide, aluminum zinc oxide, indium gallium zinc oxide, other suitable oxides, or a stacked layer of at least two of the above.

In this embodiment, a plurality of first light-shielding patterns SP1 are disposed on the second substrate 112. In this embodiment, the first light-shielding patterns SP1 are disposed corresponding to the first metal common lines MC1~MC3. In other words, in this embodiment, the second substrate 112 corresponding to each of the first metal common lines MC1~MC3 is provided with the corresponding first light-shielding pattern SP1 thereon.

In this embodiment, the vertical projection of each of the first metal common lines MC1~MC3 and two scan lines adjacent to each of the first metal common lines MC1~MC3 on the first substrate 102 is completely located within the vertical projection of the corresponding first light-shielding pattern SP1 on the first substrate 102. Specifically, as shown in FIG. 1 to FIG. 3, the vertical projection of the first metal common line MC2 and two scan lines (i.e., the scan line SL2 and the scan line SL3) adjacent to the first metal common line MC2 on the first substrate 102 is completely located within the vertical projection of the corresponding first light-shielding pattern SP1 on the first substrate 102. Although not shown in FIG. 1 to FIG. 3, persons of ordinary skill in the art should be able to understand that, the vertical projection of the first metal common line MC1 and two scan lines (i.e., the scan line SL1 and the previous scan line (not shown)) adjacent to the first metal common line MC1 on the first substrate 102 is completely located within the vertical projection of the corresponding first light-shielding pattern SP1 on the first substrate 102, and the vertical projection of the first metal common line MC3 and two scan lines (i.e., the scan line SL4 and the next scan line (not shown)) adjacent to the first metal common line MC3 on the first substrate 102 is completely located within the vertical projection of the corresponding first light-shielding pattern SP1 on the first substrate 102.

On the other hand, in this embodiment, the vertical projection of each of the active elements T1~T4 on the first substrate 102 is completely located within the vertical projection of the corresponding first light-shielding pattern SP1 on the first substrate 102 as shown in FIG. 1 to FIG. 3.

In this embodiment, a plurality of second light-shielding patterns SP2 are disposed on the second substrate 112. In this embodiment, each of the second light-shielding patterns SP2 is disposed corresponding to one of the data lines DL1~DL2 and the second metal common line MC4. In other words, in this embodiment, the second substrate 112 corresponding to each of the data lines DL1~DL2 and the second metal common line MC4 is provided with the corresponding second light-shielding pattern SP2 thereon.

In this embodiment, as shown in FIG. 3, the second light-shielding patterns SP2 are connected to the first light-shielding patterns SP1 to form a mesh light-shielding layer BM. In this embodiment, the material of the mesh light-shielding layer BM may be a material with lower reflection, such as a black resin or a light-shielding metal (e.g., Cr). Therefore, the mesh light-shielding layer BM may be used to shield components and traces which are not intended to be viewed by the user. As described above, the first metal common lines MC1~MC3, the scan lines SL1~SL4 and the active elements T1~T4 are all provided with the first light-shielding patterns SP1 above, and the data lines DL1~DL2 and the second metal common line MC4 are all provided with the second light-shielding patterns SP2 above. Thus, the mesh light-shielding layer BM is able to shield the aforementioned components to prevent the user from viewing.

In this embodiment, the insulation layer OC1 is disposed on the second substrate 112 and covers the mesh light-shielding layer BM. The material of the insulation layer OC1 may be an inorganic material, an organic material or a combination thereof. The inorganic material is, for example, silicon oxide, silicon nitride, silicon oxynitride or a stacked layer of at least two of the above materials. The organic material is, for example, a polymer material, such as a polyimide-based resin, an epoxy-based resin, or an acrylic-based resin.

In this embodiment, the plurality of first touch electrode patterns TE1 are disposed on the insulation layer OC1 and disposed on the first light-shielding patterns SP1. In other words, in this embodiment, the touch display device 10 belongs to an embedded touch display panel. In this embodiment, the first touch electrode patterns TE1 are disposed corresponding to the first metal common lines MC1~MC3. In other words, in this embodiment, each of the first metal common lines MC1~MC3 is provided with the corresponding first touch electrode pattern TE1 above. As described above, the first metal common lines MC1~MC3 are disposed corresponding to the first common electrode portions CP1. Thus, in this embodiment, the first touch electrode patterns TE1 are also disposed corresponding to the first common electrode portions CP1.

In this embodiment, the vertical projection of each of the first touch electrode patterns TE1 on the first substrate 102 is completely located within the vertical projection of the corresponding first common electrode portion CP1 on the first substrate 102 as shown in FIG. 1 to FIG. 3. In other words, in this embodiment, the main width Z of each of the first touch electrode patterns TE1 is less than or equal to the width X of each of the first common electrode portions CP1. In this embodiment, the main width Z of the first touch electrode patterns TE1 is between about 3 μm and about 300 μm, preferably between about 10 μm and about 100 μm. It should be mentioned that, in order to enable the first common electrode portions CP1 to well prevent the touch signal received by the first touch electrode patterns TE1 from being disturbed by the display signal, the main width Z of each of the first touch electrode patterns TE1 is preferably less than the width X of each of the first common electrode portions CP1.

In this embodiment, the relationship between the main width Z of each of the first touch electrode patterns TE1 and the main width w2 of each of the first metal common lines MC1~MC3 is not particularly limited. In other words, the embodiment of FIG. 1 to FIG. 3 shows that the main width Z of each of the first touch electrode patterns TE1 is larger than the main width w2 of each of the first metal common lines MC1~MC3, but in other embodiments, the main width Z of each of the first touch electrode patterns TE1 may also be less than or equal to the main width w2 of each of the first metal common lines MC1~MC3. It should be mentioned that, from a point of view of increasing the touch area, the main width Z of each of the first touch electrode patterns TE1 is preferably larger than the main width w2 of each of the first metal common lines MC1~MC3.

In this embodiment, the plurality of second touch electrode patterns TE2 are disposed on the second light-shielding patterns SP2. In this embodiment, each of the second touch electrode patterns TE2 is disposed corresponding to one of the second light-shielding patterns SP2. In this embodiment, as shown in FIG. 3, the second touch electrode patterns TE2 are connected to the first touch electrode patterns TE1 to form a mesh touch electrode layer TE. In this embodiment, the mesh touch electrode layer TE is, for example, a transparent conductive layer or an opaque conductive layer, wherein the material of the transparent conductive layer includes a metal oxide conductive material, such as indium tin oxide, indium zinc oxide, aluminum tin oxide, aluminum zinc oxide, indium gallium zinc oxide, other suitable oxides, or a stacked layer of at least two of the above, and the material of the opaque conductive layer includes metal or an alloy.

In this embodiment, the mesh touch electrode layer TE may optionally further have a plurality of opening patterns Q. Specifically, in this embodiment, the opening patterns Q are disposed corresponding to the active elements T1~T4. In other words, in this embodiment, in the vertical direction n of the first substrate 102, each of the opening patterns Q overlaps one of the active elements T1~T4. In this embodiment, the opening patterns Q are disposed corresponding to the active elements T1~T4, so that the touch signal received by the mesh touch electrode layer TE is not easily disturbed by the signal of the active elements T1~T4. That is, the touch signal received by the mesh touch electrode layer TE may not be easily disturbed by the display signal.

In this embodiment, the insulation layer OC2 is disposed on the second substrate 112 and covers the mesh touch electrode layer TE. The material of the insulation layer OC2 may be an inorganic material, an organic material or a combination thereof. The inorganic material is, for example, silicon oxide, silicon nitride, silicon oxynitride or a stacked layer of at least two of the above materials. The organic material is, for example, a polymer material, such as a polyimide-based resin, an epoxy-based resin, or an acrylic-based resin. It should be mentioned that, although not shown in FIG. 1 and FIG. 3, persons of ordinary skill in the art should be able to understand that, the touch display device 10 may optionally further include another mesh touch electrode layer disposed on the insulation layer OC2.

In this embodiment, the color filter layer CF is disposed on the insulation layer OC2. In this embodiment, the color filter layer CF includes a plurality of color filter patterns CF1~CF4, wherein the color filter pattern CF1 is disposed corresponding to the first pixel unit U1a, the color filter pattern CF2 is disposed corresponding to the second pixel unit U1b, the color filter pattern CF3 is disposed corresponding to the first pixel unit U2a, and the color filter pattern CF4 is disposed corresponding to the second pixel unit U2b, so as to achieve the display of color screen. In this embodiment, the color filter patterns CF1~CF4 may be any color filter pattern for the display panel well-known to persons of ordinary skill in the art. The color filter patterns CF1~CF4 may respectively be red filter pattern, green filter pattern or blue filter pattern, but the invention is not limited thereto.

In this embodiment, the insulation layer OC3 is disposed on the second substrate 112 and covers the color filter layer CF. The material of the insulation layer OC3 may be an inorganic material, an organic material or a combination thereof. The inorganic material is, for example, silicon oxide, silicon nitride, silicon oxynitride or a stacked layer of at least two of the above materials. The organic material is, for example, a polymer material, such as a polyimide-based resin, an epoxy-based resin, or an acrylic-based resin.

It should be noted that, as described above, in this embodiment, each of the first metal common lines MC1~MC3 is respectively disposed between two adjacent scan lines, each of the pixel sets U1~U2 is respectively located between two adjacent first metal common lines, the pixel sets U1~U2 are respectively electrically connected to two scan lines and one data line, the vertical projection of each of the first metal common lines MC1~MC3 on the first substrate 102 is completely located within the vertical projection of the corresponding first common electrode portion CP1 on the first substrate 102, the vertical projection of each of the first metal common lines MC1~MC3 and two scan lines adjacent to each of the first metal common lines MC1~MC3 on the first substrate 102 is completely located within the vertical projection of the corresponding first light-shielding pattern SP1 on the first substrate 102, and the vertical projection of each of the first touch electrode patterns TE1 on the first substrate 102 is completely located within the vertical projection of the corresponding first common electrode portion CP1 on the first substrate 102. Thus, the touch display device 10 is able to prevent the touch signal from being disturbed by the display signal and still has a good touch sensing area at the same time. Thereby, the touch display device 10 has improved touch sensitivity.

Additionally, in the touch display device 10, in the vertical direction n of the first substrate 102, the first common electrode portions CP1 do not overlap the two scan lines SL2~SL3 corresponding thereto, but the invention is not limited thereto. In other embodiments, in the vertical direction n of the first substrate 102, the first common electrode portions CP1 may partially overlap the scan line SL2 and/or the scan line SL3 corresponding thereto. The detailed embodiments are described below with reference to FIG. 4 and FIG. 5. It should be noted that the reference numerals and a part of the contents in the previous embodiment are used in the following embodiments, in which identical or similar reference numerals indicate identical or similar elements, and repeated description of the same technical contents is omitted. The omitted part of the description can refer to the foregoing embodiment, which is not repeated in the following embodiments.

Figure 4:
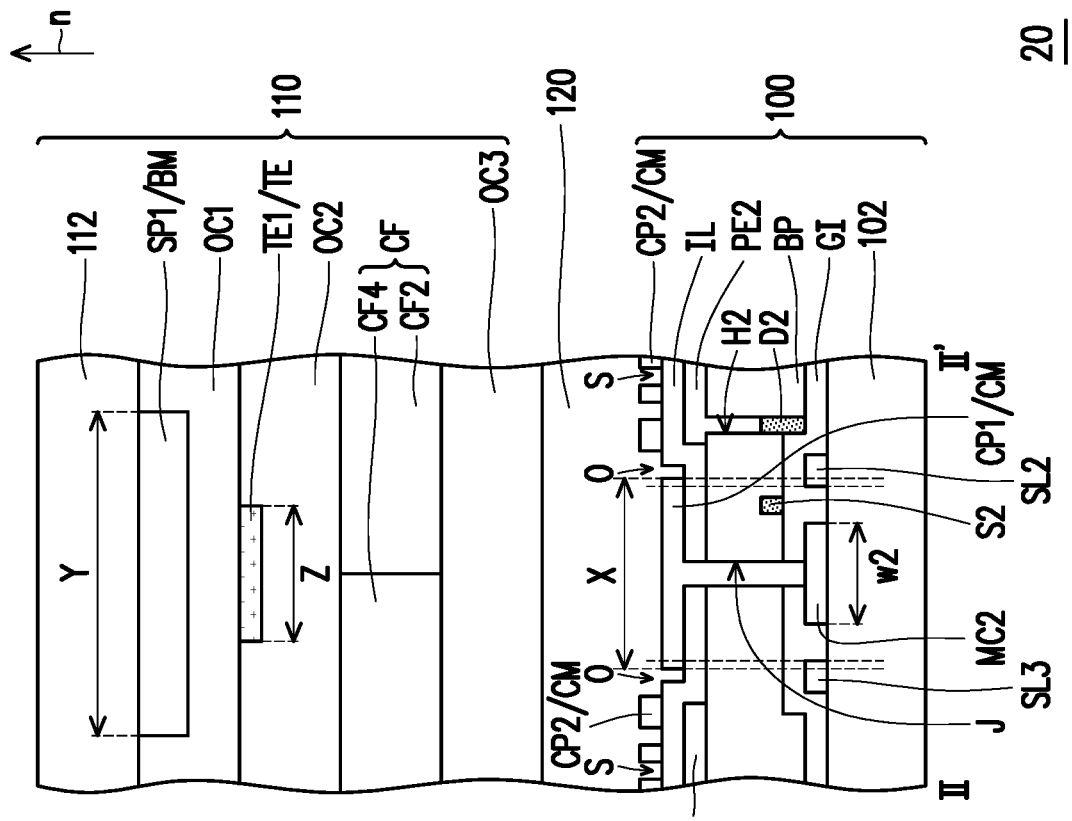
FIG. 4 is a schematic partial cross-sectional view of the touch display device according to another embodiment of the invention.
Figure 4:
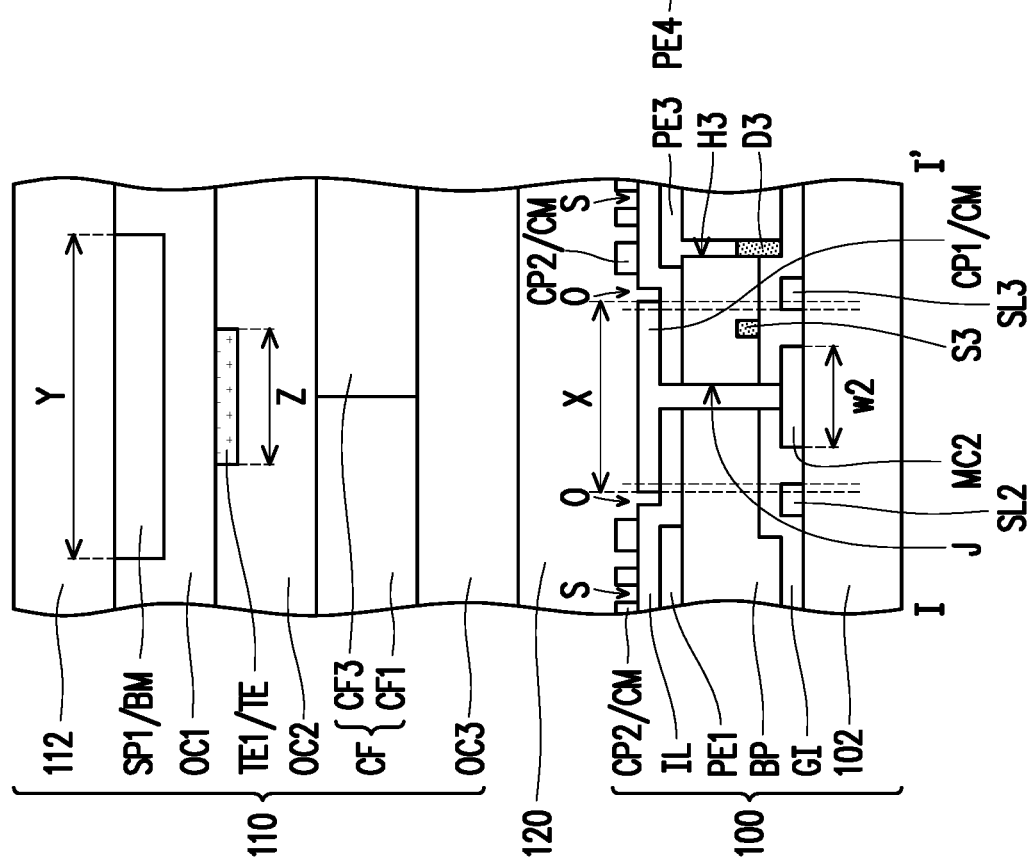

FIG. 4 is a schematic partial cross-sectional view of the touch display device according to another embodiment of the invention. The schematic top view of a touch display device 20 of FIG. 4 refers to FIG. 2 and FIG. 3, and the cross-sectional positions of FIG. 4 may respectively correspond to the positions of the section line I-I' and the section line II-II' in FIG. 2 and FIG. 3.

Referring to FIG. 4 and FIG. 1, the touch display device 20 of FIG. 4 is similar to the touch display device 10 of FIG. 1, and the differences between the two are described below.

Referring to FIG. 4, in this embodiment, in the vertical direction n of the first substrate 102, the first common electrode portion CP1 partially overlaps both of the two scan lines SL2-SL3 adjacent thereto. In other words, in this embodiment, the vertical projection of the first common electrode portion CP1 on the first substrate 102 partially overlaps the vertical projection of the scan line SL2 on the first substrate 102, and the vertical projection of the first common electrode portion CP1 on the first substrate 102 partially overlaps the vertical projection of the scan line SL3 on the first substrate 102.

In this embodiment, the overlapping area ratio of the first common electrode portion CP1 to the scan line SL2 is greater than 0 and less than or equal to 80%, and the overlapping area ratio of the first common electrode portions CP1 to the scan line SL3 is greater than 0 and less than or equal to 80%. In other words, in this embodiment, there is an overlapping area between the vertical projection of the first common electrode portion CP1 on the first substrate 102 and the vertical projection of the scan line SL2 on the first substrate 102, and the vertical projection of the scan line SL2 on the first substrate 102 will not be completely located within the vertical projection of the first common electrode portion CP1 on the first substrate 102. Similarly, there is an overlapping area between the vertical projection of the first common electrode portion CP1 on the first substrate 102 and the vertical projection of the scan line SL3 on the first substrate 102, and the vertical projection of the scan line SL3 on the first substrate 102 will not be completely located within the vertical projection of the first common electrode portion CP1 on the first substrate 102. In the descriptions, the overlapping area ratio of the first common electrode portion CP1 to the scan line SL2 is defined as, on the vertical projection plane, a ratio of the overlapping area where the scan line SL2 overlaps the first common electrode portion CP1 to the area of the scan line SL2, and the overlapping area ratio of the first common electrode portion CP1 to the scan line SL3 is defined as, on the vertical projection plane, a ratio of the overlapping area where the scan line SL3 overlaps the first common electrode portion CP1 to the area of the scan line SL3. In other words, in the descriptions, the overlapping area ratio of the first common electrode portion CP1 to the scan line corresponding thereto is defined as, on the vertical projection plane, a ratio of the overlapping area where said corresponding scan line overlaps the first common electrode portion CP1 to the area of said corresponding scan line.

It should be mentioned that, from a point of view of reducing the driving voltage of the scan lines SL2~SL3 and avoiding the increase of capacitance load, the overlapping area ratio of the first common electrode portion CP1 to the scan line SL2 is preferably less than or equal to 20%, and the overlapping area ratio of the first common electrode portion CP1 to the scan line SL3 is preferably less than or equal to 20%.

Additionally, in this embodiment, the first common electrode portion CP1 partially overlaps the scan line SL2 and the scan line SL3, but the invention is not limited thereto. In other embodiments, the first common electrode portion CP1 may only partially overlap one of the scan line SL2 and the scan line SL3.

Figure 5:
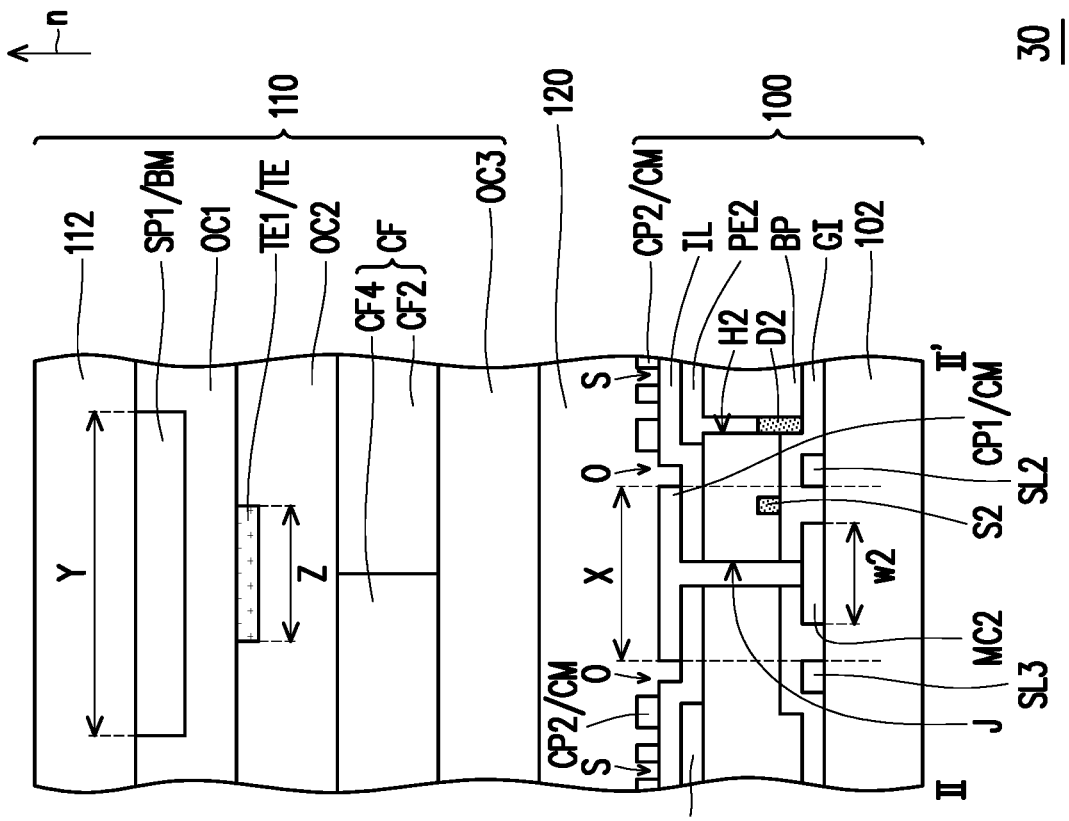
FIG. 5 is a schematic partial cross-sectional view of the touch display device according to yet another embodiment of the invention.
Figure 5:
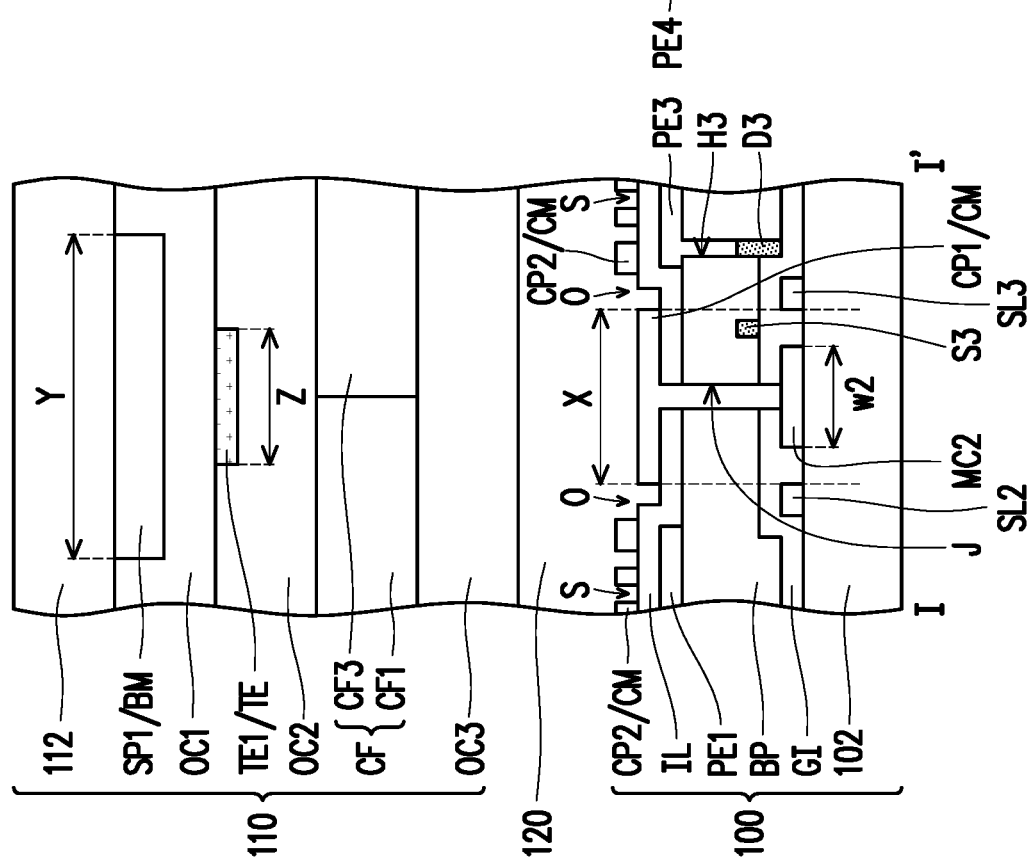

FIG. 5 is a schematic partial cross-sectional view of the touch display device according to yet another embodiment of the invention. The schematic top view of a touch display device 30 of FIG. 5 refers to FIG. 2 and FIG. 3, and the cross-sectional positions of FIG. 5 may respectively correspond to the positions of the section line I-I' and the section line II-II' in FIG. 2 and FIG. 3.

Referring to FIG. 5 and FIG. 1, the touch display device 30 of FIG. 5 is similar to the touch display device 10 of FIG. 1, and the differences between the two are described below.

Referring to FIG. 5, in this embodiment, one side of the first common electrode portion CP1 is aligned with one side of the scan line SL2 adjacent thereto, and one side of the first common electrode portion CP1 is aligned with one side of the scan line SL3 adjacent thereto. In other words, in this embodiment, the vertical projection of the first common electrode portion CP1 on the first substrate 102 overlaps the vertical projection of the scan line SL2 on the first substrate 102, but the overlapping area is 0 (i.e., the overlapping area ratio is 0), and the vertical projection of the first common electrode portion CP1 on the first substrate 102 overlaps the vertical projection of the scan line SL3 on the first substrate 102, but the overlapping area is 0 (i.e., the overlapping area ratio is 0).

Additionally, in this embodiment, the first common electrode portion CP1 is aligned with both the scan line SL2 and the scan line SL3, but the invention is not limited thereto. In other embodiments, the first common electrode portion CP1 may be only aligned with one of the scan line SL2 and the scan line SL3.

In summary, in the touch display device of the invention, the pixel array substrate includes the plurality of scan lines, the plurality of data lines, the plurality of first metal common lines, the plurality of pixel sets and the common electrode layer disposed on the first substrate, and the opposite substrate includes the plurality of first light-shielding patterns and the plurality of first touch electrode patterns disposed on the second substrate. In detail, each of the first metal common lines is disposed between two adjacent scan lines, each of the pixel sets is located between two adjacent first metal common lines, each of the pixel sets is electrically connected to two scan lines and one data line, the vertical projection of each of the first metal common lines on the first substrate is completely located within the vertical projection of the corresponding first common electrode portion included in the common electrode layer on the first substrate, the vertical projection of each of the first metal common lines and the two scan lines adjacent to each of the first metal common lines on the first substrate is completely located within the vertical projection of the corresponding first light-shielding pattern on the first substrate, and the vertical projection of each of the first touch electrode patterns on the first substrate is completely located within the vertical projection of the corresponding first common electrode portion on the first substrate. Thereby, the touch display device of the invention is able to prevent the touch signal from being disturbed by the display signal and still has the good touch area at the same time, such that the touch display device of the invention has the improved touch sensitivity.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A touch display device, comprising:
  a pixel array substrate, comprising:
    a first substrate;
    a plurality of scan lines and a plurality of data lines, disposed on the first substrate, wherein the data lines are not disposed parallel to the scan lines;
    a plurality of first metal common lines, disposed on the first substrate, each of the first metal common lines is disposed between two adjacent scan lines;
    a plurality of pixel sets, arranged in array on the first substrate, each of the pixel sets is located between two adjacent first metal common lines, and each of the pixel sets is electrically connected to two of the scan lines and one of the data lines; and
    a common electrode layer, disposed on the first substrate, wherein the pixel sets are structurally separated from the common electrode layer, the common electrode layer comprises a plurality of first common electrode portions and a plurality of second common electrode portions, the first common electrode portions are disposed corresponding to the first metal common lines, and a vertical projection of each of the first metal common lines on the first substrate is completely located within a vertical projection of the corresponding first common electrode portion on the first substrate;
  an opposite substrate, disposed opposite to the pixel array substrate, comprising:
    a second substrate;
    a plurality of first light-shielding patterns, disposed on the second substrate, wherein the first light-shielding patterns are disposed corresponding to the first metal common lines, a vertical projection of each of the first metal common lines and the two scan lines adjacent to each of the first metal common lines on the first substrate is completely located within a vertical projection of the corresponding first light-shielding pattern on the first substrate; and a plurality of first touch electrode patterns, disposed on the first light-shielding patterns, wherein the first touch electrode patterns are disposed corresponding to the first metal common lines, and a vertical projection of each of the first touch electrode patterns on the first substrate is completely located within a vertical projection of the corresponding first common electrode portion on the first substrate; and a liquid crystal layer, disposed between the pixel array substrate and the opposite substrate wherein each of the pixel sets comprises a first pixel unit and a second pixel unit, and the first pixel unit and the second pixel unit respectively comprise:

an transistor; and a pixel electrode, electrically connected to the transistor, wherein the transistor of the first pixel unit and the transistor of the second pixel unit are electrically connected to different scan lines, wherein the transistor of the first pixel unit and the transistor of the second pixel unit are electrically connected to the same data line.

2. The touch display device according to claim 1, wherein a main width of each of the first metal common lines is between 3 micrometers (μm) and 300 μm.

3. The touch display device according to claim 1, wherein a main width of each of the first touch electrode patterns is larger than a main width of each of the first metal common lines.

4. The touch display device according to claim 1, wherein a material of the first metal common lines is the same as a material of the scan lines.

5. The touch display device according to claim 1, wherein the pixel array substrate further comprises:

at least one second metal common line, disposed on the first substrate, wherein the second metal common line is located between two adjacent data lines.

6. The touch display device according to claim 5, wherein the first metal common lines are electrically connected to the common electrode layer, and the second metal common line is electrically connected to the common electrode layer.

7. The touch display device according to claim 1, wherein the second common electrode portions have a plurality of slits disposed corresponding to the pixel electrodes.

8. The touch display device according to claim 1, wherein the common electrode layer further has a plurality of opening patterns, and the opening patterns overlap the transistors and the scan lines in a vertical direction of the first substrate.

9. The touch display device according to claim 1, wherein the opposite substrate further comprises:

a plurality of second light-shielding patterns, disposed on the second substrate, wherein the second light-shielding patterns are connected to the first light-shielding patterns to form a mesh light-shielding layer.

10. The touch display device according to claim 9, wherein the opposite substrate further comprises:

a plurality of second touch electrode patterns, disposed on the second light-shielding patterns, wherein the second touch electrode patterns are connected to the first touch electrode patterns to form a mesh touch electrode layer.

11. The touch display device according to claim 9, wherein the mesh light-shielding layer is disposed between the first touch electrode patterns and the second substrate.

12. The touch display device according to claim 1, wherein a main width of each of the first touch electrode patterns is less than a width of each of the first common electrode portions.

13. The touch display device according to claim 1, wherein at least one of the first common electrode portions in the common electrode layer does not overlap two scan lines corresponding thereto.

14. The touch display device according to claim 1, wherein a first scan line is electrically connected to the first pixel unit, a second scan line is electrically connected to the second pixel unit, and at least one of the first common electrode portions in the common electrode layer partially overlaps the first scan line and the second scan line.

15. The touch display device according to claim 14, wherein an overlapping area ratio of at least one of the first common electrode portions in the common electrode layer to one of the first scan line and the second scan line is from 0 to 80%.

16. A touch display device, comprising:

a pixel array substrate, comprising:

a first substrate;

a plurality of scan lines and a plurality of data lines, disposed on the first substrate, wherein the data lines are not disposed parallel to the scan lines;

a plurality of first metal common lines, disposed on the first substrate, each of the first metal common lines is disposed between two adjacent scan lines;

a plurality of pixel sets, arranged in array on the first substrate, each of the pixel sets is located between two adjacent first metal common lines, and each of the pixel sets is physically connected to two of the scan lines and one of the data lines; and a common electrode layer, disposed on the first substrate, wherein the pixel sets are structurally separated from the common electrode layer, the common electrode layer comprises a plurality of first common electrode portions and a plurality of second common electrode portions, the first common electrode portions are disposed corresponding to the first metal common lines, and a vertical projection of each of the first metal common lines on the first substrate is completely located within a vertical projection of the corresponding first common electrode portion on the first substrate;

an opposite substrate, disposed opposite to the pixel array substrate, comprising:

a second substrate;

a plurality of first light-shielding patterns, disposed on the second substrate, wherein the first light-shielding patterns are disposed corresponding to the first metal common lines, a vertical projection of each of the first metal common lines and the two scan lines adjacent to each of the first metal common lines on the first substrate is completely located within a vertical projection of the corresponding first light-shielding pattern on the first substrate; and a plurality of first touch electrode patterns, disposed on the first light-shielding patterns, wherein the first touch electrode patterns are disposed corresponding to the first metal common lines, and a vertical projection of each of the first touch electrode patterns on the first substrate is completely located within a vertical projection of the corresponding first common electrode portion on the first substrate; and a liquid crystal layer, disposed between the pixel array substrate and the opposite substrate.

17. A touch display device, comprising:
a pixel array substrate, comprising:
- a first substrate;
- a plurality of scan lines and a plurality of data lines, disposed on the first substrate, wherein the data lines are not disposed parallel to the scan lines;
- a plurality of first metal common lines, disposed on the first substrate, each of the first metal common lines is disposed between two adjacent scan lines;
- a plurality of pixel sets, arranged in array on the first substrate, each of the pixel sets is located between two adjacent first metal common lines, and each of the pixel sets is electrically connected to two of the scan lines and one of the data lines; and
- a common electrode layer, disposed on the first substrate, wherein the pixel sets are structurally separated from the common electrode layer, the common electrode layer comprises a plurality of first common electrode portions and a plurality of second common electrode portions physically connected to the plurality of first common electrode portions, the first common electrode portions are disposed corresponding to the first metal common lines, and a vertical projection of each of the first metal common lines on the first substrate is completely located within a vertical projection of the corresponding first common electrode portion on the first substrate;

an opposite substrate, disposed opposite to the pixel array substrate, comprising:
- a second substrate;
- a plurality of first light-shielding patterns, disposed on the second substrate, wherein the first light-shielding patterns are disposed corresponding to the first metal common lines, a vertical projection of each of the first metal common lines and the two scan lines adjacent to each of the first metal common lines on the first substrate is completely located within a vertical projection of the corresponding first light-shielding pattern on the first substrate; and
- a plurality of first touch electrode patterns, disposed on the first light-shielding patterns, wherein the first touch electrode patterns are disposed corresponding to the first metal common lines, and a vertical projection of each of the first touch electrode patterns on the first substrate is completely located within a vertical projection of the corresponding first common electrode portion on the first substrate; and a liquid crystal layer, disposed between the pixel array substrate and the opposite substrate.

* * * * *